H. H. STYLL.
LENS MOUNTING.
APPLICATION FILED JULY 21, 1913.
1,200,150.
Patented Oct. 3, 1916.
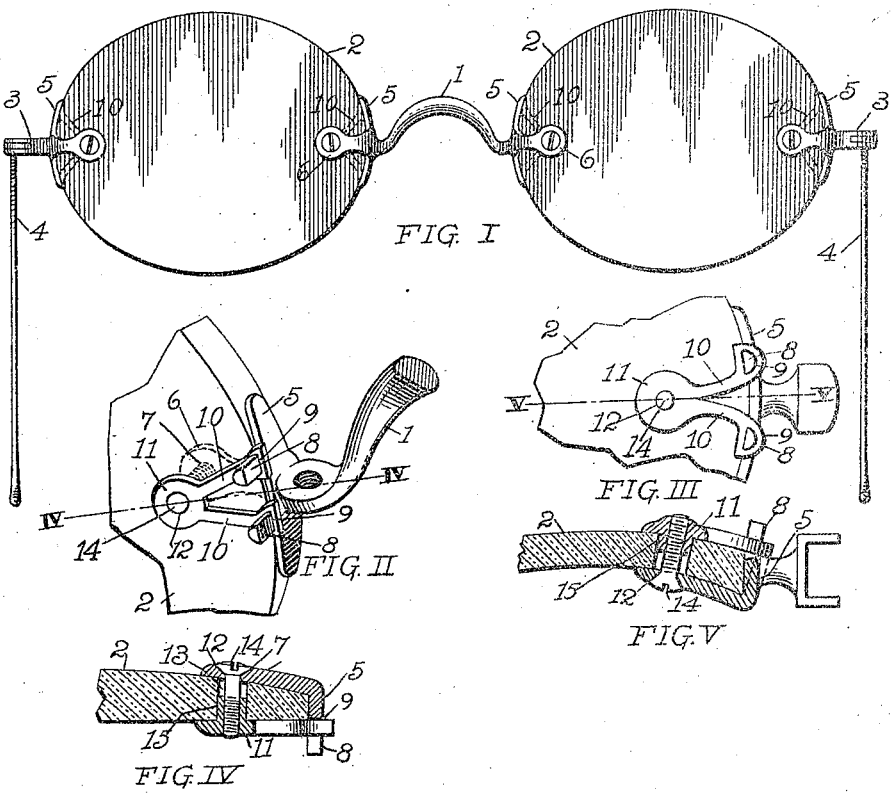
WITNESSES:
Joseph J. Demers
Florence E. Coderre
INVENTOR
HARRY H. STYLL
By
H. H. Styll & A. K. Parsons
ATTORNEYS

UNITED STATES PATENT OFFICE.

HARRY H. STYLL, OF SOUTHBRIDGE, MASSACHUSETTS.

LENS-MOUNTING.

1,200,150.

Specification of Letters Patent.

Patented Oct. 3, 1916.

Application filed July 21, 1913. Serial No. 780,212.

*To all whom it may concern:*

Be it known that I, HARRY H. STYLL, a citizen of the United States, residing at Southbridge, in the county of Worcester and State of Massachusetts, have invented certain new and useful Improvements in Lens-Mountings, of which the following is a specification.

My invention relates to improvements in lens mountings and has for its leading object the provision of an improved mounting particularly adapted for use in conjunction with various forms of spectacles for satisfactorily retaining various lenses in position.

A further object of my invention is the provision of an improved mounting which may be readily adapted to satisfactorily accommodate lenses of varying shapes and thicknesses and will securely hold the lenses in desired position relative to the supports therefor.

Another object of my invention is the provision of an improved mounting in which one of the arms may be easily shortened and which will, therefore, be particularly applicable for use in the satisfactory mounting of either plano, concave, convex or toric lenses.

Other objects and advantages of my invention should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a view of one form of spectacle embodying my lens mountings or attachments. Fig. II represents an enlarged fragmentary view particularly illustrating one embodiment of my construction. Fig. III is a similar view illustrating my construction as applied to a toric lens. Fig. IV represents a sectional view on the line IV—IV of Fig. II. Fig. V represents a sectional view taken on the line V—V of Fig. III. Fig. VI represents a perspective view of another form of my invention.

In the drawings, the numeral 1 designates the bridge of a spectacle bearing at each end a lens clip of my improved construction for mounting the lenses 2, the said lenses 2 having secured to the outer portions thereof additional clips carrying the end pieces 3 and temples 4 for retaining the mounting in position. It is to be understood that while I have shown my improvements as applied to that form of spectacle mounting which is retained by temples, that it is equally applicable to any other form of either spring bridge or spring pressed guard mounting, in all forms serving to satisfactorily retain and support the lenses.

In that form of my invention shown in Figs. I to V inclusive, I have shown my mounting as comprising the strap portion 5 adapted to bear against the edge of a lens, said strap portion having formed integral therewith, or suitably secured thereto, the ear 6 for engaging one side of the lens 2, said ear having a screw receiving aperture 7 formed therein. Projecting from the strap 5 on the opposite side from that on which the ear 6 is disposed are the prongs or lugs 8 preferably two in number disposed toward the ends or terminal portions of the strap 5 and adapted to be engaged in the apertures 9 of the furcations or arms 10 of the second clip ear 11, which is adapted to lie on the opposite side of the lens from the ear 6, and has a screw receiving aperture 12, in use the apertures 7 and 12 being brought into alinement with each other at opposite ends of the screw receiving aperture 13 formed in the lens. One of said apertures is preferably screw threaded to engage the threaded portion of the lens screw 14, while, if desired, the threaded aperture may be surrounded by a tube or bushing 15 on one side thereof, this bushing either fitting into the aperture in the lens, or, as shown in Fig. V, projecting slightly from each side of the ear, thus furnishing additional threads to better retain the lens screw in place.

It is to be noted that in all the forms of my invention two decided advantages are attained by the employment thereof, while in most of the forms a third advantage is also attainable. The two advantages common to all forms are adjustability of the length of one of the lens engaging ears so that the mounting may satisfactorily fit any form of lens, and the bracing of the strap to prevent loosening thereof and thus drooping of the lenses.

The third advantage which is attained by most of the forms of my invention illustrated is that of adjustment of the separation of the two lens clip ears so that a single clip or lens attachment may serve to accommodate a wide range of thicknesses of lenses. The bracing of the strap and the adjustment for thickness should be readily apparent by reference to the drawings.

The fitting of lens clips to toric lenses or lenses of similar form has been a matter of considerable difficulty, with any lens clip at present known, whether said clip be of rigid or other form, this being due to the fact that this type of lens, as clearly illustrated in Fig. V, has a decided curvature, not only on one but on both sides, in the same direction, while the side is cut at an angle to the general curve of the lens. In drilling a lens of this type it is customary to drill the lens screwed aperture as nearly as possible at right angles to the general plane of the lens, as there is less liability of cracking of the lens when so drilled, and also its operation can be more easily performed with the ordinary drill. As is clearly illustrated in Fig. V, this drilling causes the lens screwed aperture to be considerably nearer the edge of the lens on one side than on the other, and as it has hitherto been customary to construct lens clips with both ears of equal length and with the apertures registering with one another, when fitting this type of clip to a toric or similar lens the optician frequently fits it to engage but one edge of the lens, as indicated in dotted lines in Fig. V, this making a weak connection, as should be readily apparent.

By the use of my present device, however, while the clip ears are ordinarily of substantially the same length as illustrated in Fig. IV, when it is desired to apply my clip to a lens of the toric type the strap is bent at the correct angle to the ear 6 so that said ear and strap will both lie substantially tight against the adjacent portions of the lens, as illustrated in Fig. V, and then the second clip ear 11 is adjusted so that its aperture 12 will register with the screw receiving aperture 13 of the lens and at the same time the furcations 10 will hold the strap in tight engagement with the edge of the lens. This adjustment is attained by drawing together or spreading of the furcations 10 to vary the distance between the aperture 12 and the strap engaging portions of said furcations, drawing together of the furcations shortening the clip ear, while spreading serves to lengthen the same, as is illustrated. It will thus be seen that whatever the shape of lens to which my clip is applied, the aperture in the lens need be drilled only with respect to the aperture in the fixed ear 6 and the other ear may then be adjusted to hold the strap in tight engagement with the edge of the lens and at the same time to have its own aperture in correct position relative to the aperture in the lens.

From the foregoing description taken in connection with the accompanying drawings the construction and advantages of my improved lens attachment should be readily apparent, and it will be seen that I have provided a novel device of this nature which may with equal satisfaction be employed on any shape or thickness of lens and permit of the secure mounting of the lens therein.

I claim:

1. In combination, a lens having an aperture formed therein, a strap rigidly associated with the edge of the lens, an ear extending from one edge of the strap, pins carried by the opposite edge of the strap, converging pliable members having apertures formed in their free ends for engagement on said pins, said members terminating in a clip ear, a bushing formed on said ear for engagement with the aperture in the lens, and a screw passing through the first ear and threaded into said bushing, as and for the purpose set forth.

2. A lens clip comprising a strap portion having an ear extending from one edge thereof, said strap portion being rigidly associated with the edge of the lens, pins carried by the opposite edge of the strap portion, and converging pliable members terminating in a clip ear for holding the strap in rigid engagement with the edge of the lens, and permitting of adjustment to adapt the clip to lenses having lens screw receiving apertures of varying distances from the edge of the lenses, the free ends of said pliable members having apertures formed therein for engagement with said pins, as and for the purpose set forth.

3. A sectional lens clip, comprising a strap portion having an ear extending from one edge thereof, and a second member having a lens engaging ear and having diverging pliable members adapted to extend outwardly from the ear toward the edge of the lens, the termini of said pliable members and the termini of the strap having interlocking tongue and socket connections one with the other, whereby said pliable members serve to brace the ends of the strap member to hold the strap in rigid engagement with the edge of the lens, substantially as and for the purpose described.

In testimony whereof I affix my signature in presence of two witnesses.

HARRY H. STYLL.

Witnesses:
FLORENCE E. CODERRE,
H. K. PARSONS.